Oct. 27, 1953   C. J. BOWERMAN   2,656,759
MICROSCOPE NOSEPIECE
Filed May 15, 1950
FIG. 3
FIG. 1
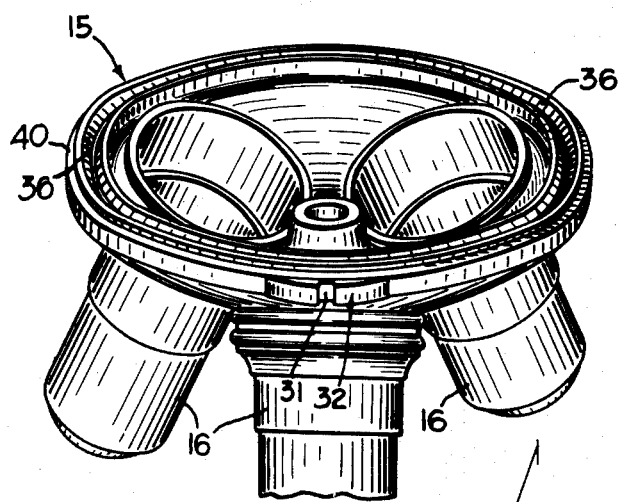
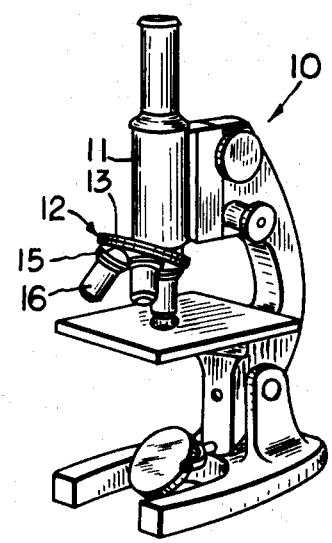
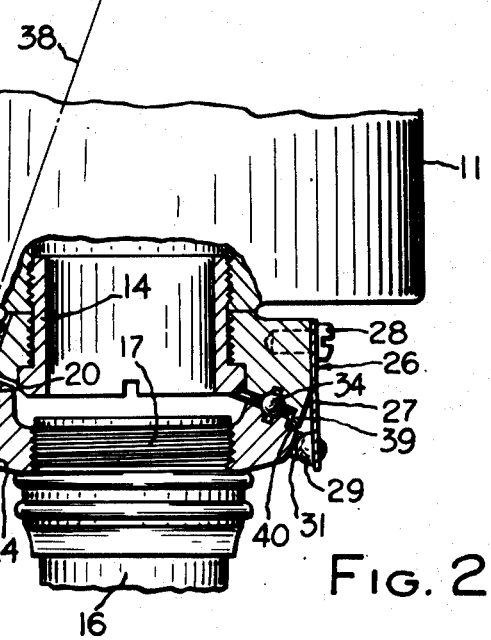
FIG. 2
INVENTOR.
CLARENCE J. BOWERMAN
BY
*J. A. Ellestad*
ATTORNEY Patented Oct. 27, 1953

2,656,759

UNITED STATES PATENT OFFICE 2,656,759

MICROSCOPE NOSEPIECE

Clarence J. Bowerman, Pittsford, N. Y., assignor to Bausch & Lomb Optical Company, Rochester, N. Y., a corporation of New York Application May 15, 1950, Serial No. 162,049

5 Claims. (Cl. 88—39)

This invention relates to microscopes and more particularly to a microscope nosepiece which carries a plurality of objectives which are adapted to be selectively positioned in operative relation to the eyepiece.

Such a nosepiece usually embodies a stationary supporting member on which an objective carrying member is rotatably mounted by means of a central stud or its equivalent, the stud being the sole means of holding and guiding the latter member on the supporting member. It is a prime requisite of such a nosepiece that the objective carrying member rotate freely so that the angular positioning detent for this member may properly function to locate a selected objective in its correct operating position. Any considerable friction between said members, especially when the friction occurs near their peripheries, results in misalignment of the selected objective, since the friction works against the detent action and causes the objective to come to rest out of proper alignment with the optical axis of the microscope. Repeatability of the rest positions of the selected objective, when it is swung out of position and then back again, is very necessary but it cannot be obtained as long as such friction is present.

On the other hand, if there is a free running fit between the bearing surfaces which position said members, the amount of looseness is found to be sufficient to allow the objective to slightly tilt out of alignment when side pressure is applied by the detent mechanism or other causes. Some prior art devices have been built to overcome this defect by sufficiently lengthening the pivot bearing so as to reduce the effective looseness, but the adoption of this expedient means that the pivot mechanism would project a prohibitive distance below the nosepiece. In any case, the center-bearing type of nosepiece found in the prior art is costly to build and maintain by reason of the great amount of skilled workmanship required in the fitting and adjustment of the bearings and associated parts to make them work properly, and such operations result in excessively high labor costs.

In view of these difficulties, it is an object of this invention to provide a novel bearing for a microscope nosepiece by which the alignment of the parts of the nosepiece in all of their operative positions is facilitated.

Another object is to provide a nosepiece in which the rotatable part is seated on the supporting part by means of a frictionless bearing located in the peripheral portions of each of said parts for the purpose of reliably positioning the objectives, which are carried by the nosepiece, with respect to the optical axis of the microscope.

A further object is to provide such a device in which the relatively rotatable parts have annular bearing surfaces which are so inclined to the axis of rotation that the bearing surfaces serve as the sole centering means for relatively positioning said members.

It is another object to provide such a device which is easy to assemble, requires no costly fitting or adjusting operations, and wears so little in ordinary use that the nosepiece may be permanently adjusted when it is first assembled.

Further objects and advantages will be found in the novel details of construction and combination and arrangement of the parts of this invention by referring to the specification herebelow and the accompanying drawing in which:

Fig. 1 is a general perspective view of a microscope which embodies one form of my invention.

Fig. 2 is an enlarged longitudinal sectional view of the nosepiece shown in Fig. 1, and, Fig. 3 is a perspective view of the rotatable part of the nosepiece shown in Fig. 2.

In Fig. 1 of the drawing, a microscope is shown generally at 10 having a body tube 11 on which a nosepiece 12 is secured. The nosepiece 12 comprises a stationary concavo-convex supporting member 13 which is attached by any suitable means, such as the clamping sleeve 14, to the body tube 11. On the stationary member 13, is rotatably mounted a concavo-convex member 15 on which a plurality of different powered objectives 16 are secured by any suitable means such as the threads 17 shown in Fig. 2. For the purpose of rotatably holding the objective carrying member 15 on its supporting member 13, a stud 18 is secured by means of the thread 19 in the center of member 13 so as to extend downwardly through an oversized hole 20 in member 15. The outer end of the stud 18 has a head 21 against which is seated one end of spring 22 while the other end of the spring bears against the bottom surface of a recess 23 in the objective carrying member 15 so as to resiliently hold the parts together. A bumper washer 24, preferably formed of plastic material such as Micarta, may be permanently seated in a suitable recess 25 in the under surface of the objective carrying member 15, but the washer is not essential to the proper operation of the nosepiece. Normally a slight amount of clearance is provided between the washer and head 21 of the stud 18 to allow proper action of spring 22.

Rotatable member 15 has several angularly-spaced operating positions corresponding to the number of objectives 16 and these positions are established by detent mechanism 26. This device includes a flat blade 27 formed of spring material which is secured by suitable means, such as the screws 28, to the outer edge of member 13, so as to extend downwardly over the outer edge of member 15 and the blade carries at its lower end a rounded contact button 29. When in operative position, the button 29 is adapted to forcibly engage in a notch 31 which is formed in each of several raised portions or ramps 32 (Fig. 3), corresponding in number to the number of objectives 16, on the outer edge of rotatable member 15.

According to this invention, an antifrictional thrust bearing 33, preferably of the ball bearing type, is provided between the stationary and rotatable members 13 and 15 at their peripheral portions. A maximum of stability of axial alignment of the objectives 16 is secured by locating the annular bearing 33 near the peripheries of said members so as to provide a broad "bearing base" without appreciably increasing the amount of frictional contact between said members. As shown in the drawing, the thrust bearing 33 comprises a plurality of balls 34 which roll on a companion set of annular ball races 35 and 36 located in the stationary and rotatable members 13 and 15, respectively. The balls are separated by a spacer 37 which is loosely held in the clearance space between said members.

Of special importance, is the fact that the sides of the ball races 35 and 36 are inclined at a steep angle to the axis of rotation 38 of member 15 so as to centralize the latter on the stationary supporting member 13. Thus the steep sided races prevent extraneous side pressure from tending to displace the objective, that is in use, from its true aligned position. To exclude foreign matter from the ball bearing, a peripheral lip 39 extends downwardly from member 13 to cover a shoulder 40 that is formed on the outer surface of member 15.

The nosepiece 12 is very simply assembled by holding the objective carrying member 15 horizontally while inserting the balls 34 in the lower race 36 with the spacer 37 in place. When the balls 34 are all in place, member 15 is placed adjacent to the support member 13 so as to engage the balls in the upper race 35 whereupon the lip 39 comes down over the shoulder 40. Then the spring 22 is placed on stud 18 which is threaded tightly into the threaded hole 19 to hold the parts together. The strength of the spring 22 is not critical since it is only necessary that the strength be sufficient to positively preload the bearing 33. No costly painstaking fitting or readjustment is required either during assembly or thereafter as is required in devices of the prior art.

Microscope nosepieces constructed according to the foregoing description embody two very necessary features, namely, an annular bearing area on the objective carrying part having large radial dimensions for the purpose of preventing unwanted tilt of the objectives, and a load bearing between the rotatable and stationary members having virtually no frictional drag which might prevent proper functioning of the locating detent mechanism, all of which is in accord with the stated objects of this invention.

Although but one embodiment of this invention has been shown and described in detail, it will be understood that other embodiments are possible and that changes may be made therein without departing from the spirit of this invention as defined in the appended claims.

I claim:

1. A microscope nosepiece comprising a stationary support member, means for fixing said member on a microscope, an objective carrying member rotatably mounted on the support member to turn about an axis so as to position a selected objective in operative position, annular bearing surfaces inclined with respect to said axis and located oppositely to each other on the respectively adjacent outer portions of said members, said surfaces being in converging relationship to each other, a plurality of antifrictional bearing elements positioned between and in rolling contact with said surfaces, means for retaining said elements between said surfaces, said surfaces and elements providing the sole means for centering one member relative to the other, and means carried by one member for urging the surfaces into contact with the elements, said surfaces being of substantially maximum radial dimensions whereby stability of alignment of the objectives is secured.

2. In a microscope nosepiece having a stationary support member and an objective carrying member rotatably mounted thereon to turn about an axis, the combination of an anti-friction thrust bearing located between said members adjacent their peripheral portions, the bearing races of said bearing being formed on opposing faces of said members, anti-friction elements in rolling contact with the races, said races being inclined to the axis of rotation of the objective carrying member and providing with the elements the sole means for centering the rotating member on the support member, said races having surfaces in converging relation to each other, and means carried by the support member for urging the members together for applying pressure through said bearing to hold said members and elements in assembled position whereby a frictionless bearing of maximum radial dimension is provided to secure stability of alignment of the objectives carried by the rotatable member.

3. A nosepiece for microscopes comprising a supporting member adapted to be detachably secured to a microscope body tube, a second member rotatably mounted on the supporting member to turn about an axis and adapted to carry objective lenses, cooperating annular bearing surfaces carried on the peripheral parts of the respective members, the surfaces on the respective parts being in converging relation to each other and inclined to the axis, anti-friction elements positioned between the bearing surfaces, said cooperating bearing surfaces and elements being the sole means for centering one member relative to the other, a stud centrally disposed with respect to said members for holding them together, said second member having an oversize aperture through which the stud passes, and a spring on the stud for resiliently urging said bearing surfaces into engagement with the anti-friction elements.

4. A microscope nosepiece comprising a stationary support member which is fixed to a microscope tube, a headed stud centrally fixed on said member, an objective holding member loosely mounted for rotation on said stud, a ball thrust bearing including a pair of circular V-grooved ball races located opposite to each other on the adjacent peripheral portions of both said members, a plurality of ball bearing elements positioned in said races, the surfaces of said races being inclined to their axis of rotation so that said bearing acts as the sole means for centering one member on the other, and a spring seated under pressure between the head of said stud and the second named member to urge the latter toward the support member whereby the thrust-bearing acts simultaneously to center said members relative to each other and to secure stability of alignment of the objectives in the second named member by reason of the large radial dimension of the bearing.

5. A microscope nosepiece comprising a stationary member adapted to be secured to a microscope tube, an objective carrying member having a central aperture, a headed stud carried by said stationary member and passing through said aperture, the body of said stud being smaller than the aperture whereby the objective carrying member is loosely and rotatably held to the stationary member, annular bearing surfaces located oppositely to each other on the respectively adjacent peripheral portions of said members, at least one bearing surface on one portion being in converging relation to a bearing surface on the other portion, anti-friction bearing elements positioned between and in rolling contact with said surfaces, means for holding the elements in position, and a spring on said stud which urges the bearing surfaces into engagement with the anti-friction elements, said bearing surfaces and elements being the sole means for centering the objective carrying member on the stationary member.

CLARENCE J. BOWERMAN.

References Cited in the file of this patent

UNITED STATES PATENTS

| Number | Name | Date |
|---|---|---|
| 1,023,390 | Ott et al. | Apr. 16, 1912 |
| 1,428,990 | Sloan | Sept. 12, 1922 |
| 1,674,041 | Henker | June 19, 1928 |
| 1,729,690 | Sloan | Oct. 1, 1929 |
| 1,798,634 | Schafer | Mar. 31, 1931 |
| 2,263,344 | Wittig | Nov. 18, 1941 |